Nov. 16, 1943.  F. STEVENS  2,334,294
APPARATUS FOR LINING PIPES
Filed Dec. 14, 1939  3 Sheets-Sheet 1
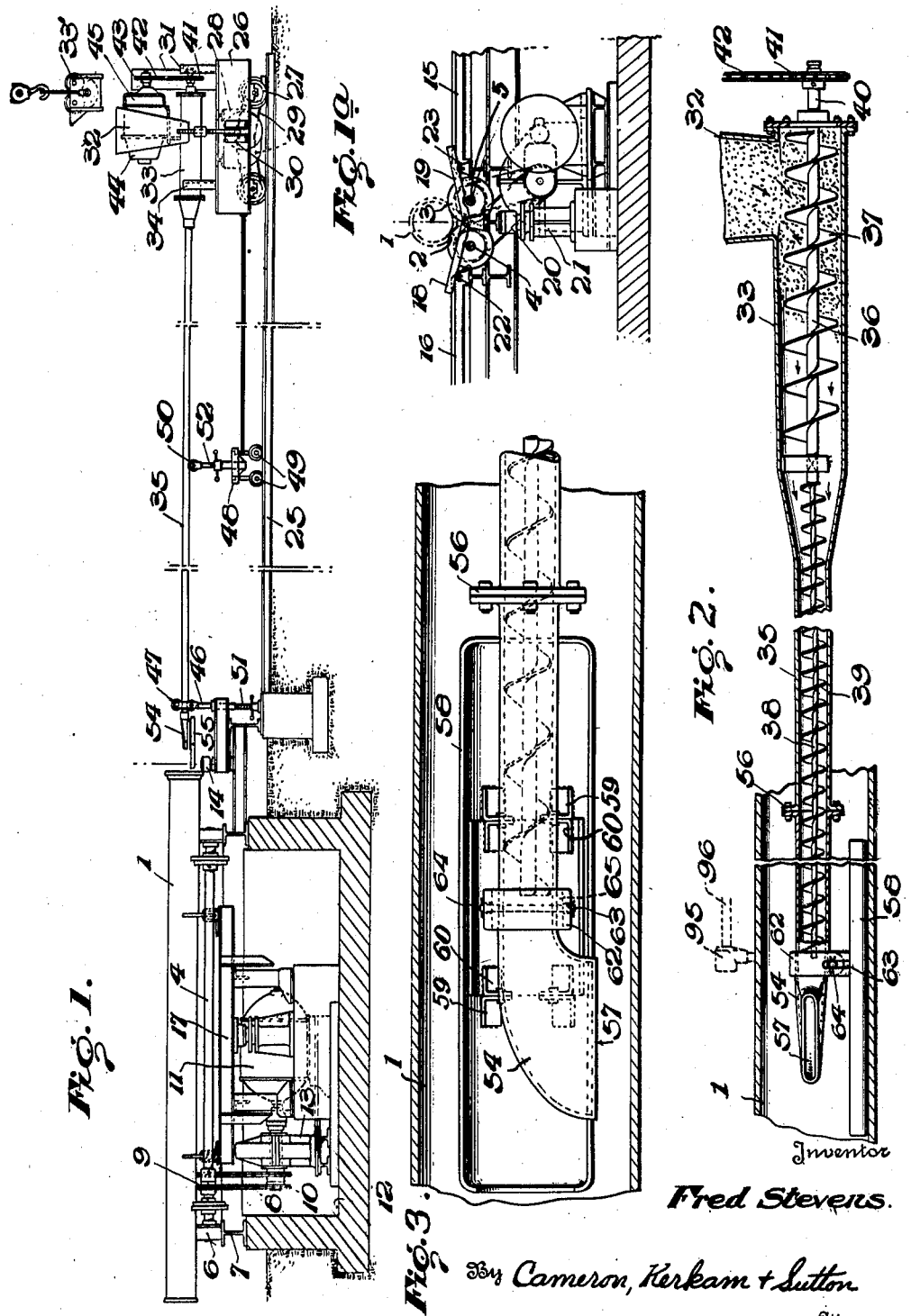
Inventor
Fred Stevens.
By Cameron, Kerkam + Sutton
Attorneys Nov. 16, 1943.　　　　F. STEVENS　　　　2,334,294
APPARATUS FOR LINING PIPES
Filed Dec. 14, 1939　　　　3 Sheets-Sheet 2
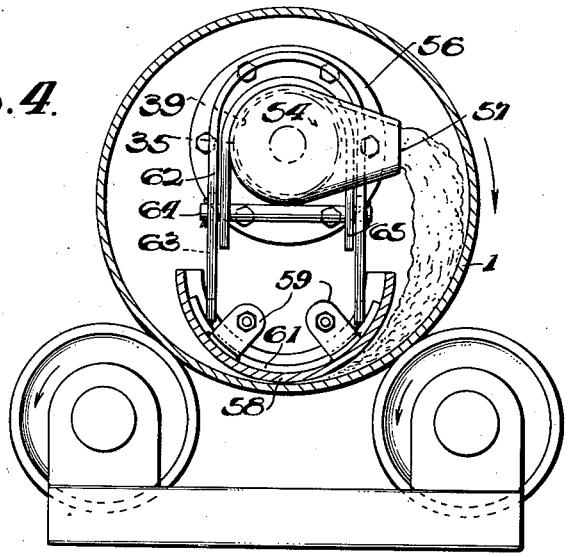
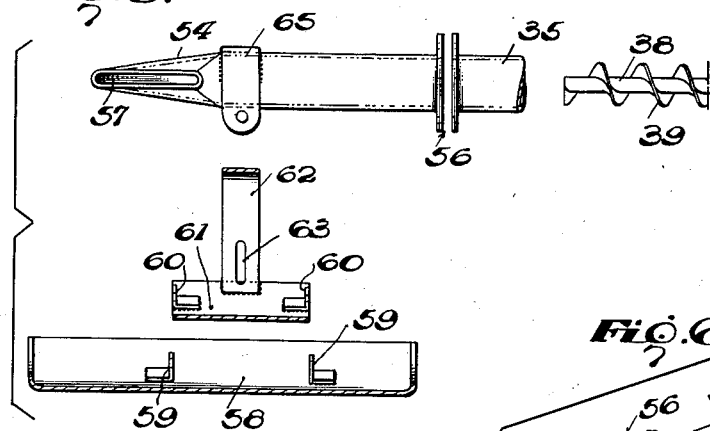
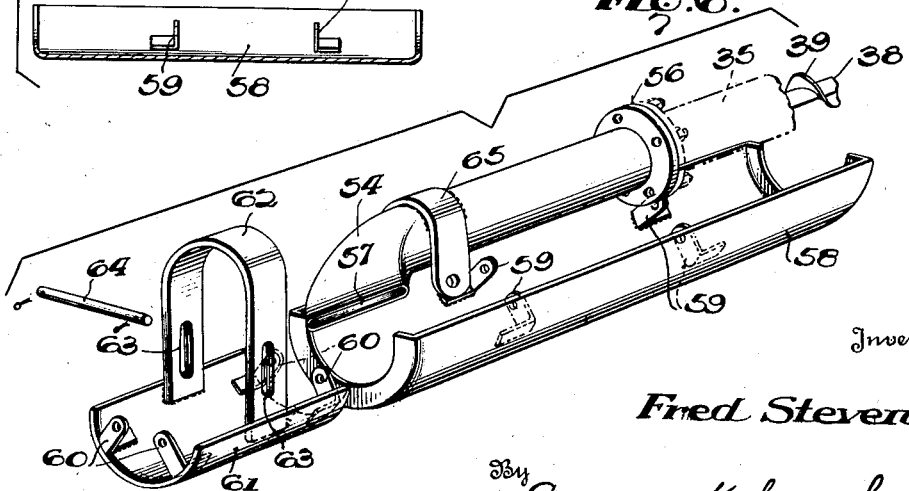
Inventor
Fred Stevens.
By Cameron, Kerkam + Sutton
Attorneys Nov. 16, 1943.          F. STEVENS                2,334,294
              APPARATUS FOR LINING PIPES
                 Filed Dec. 14, 1939            3 Sheets-Sheet 3
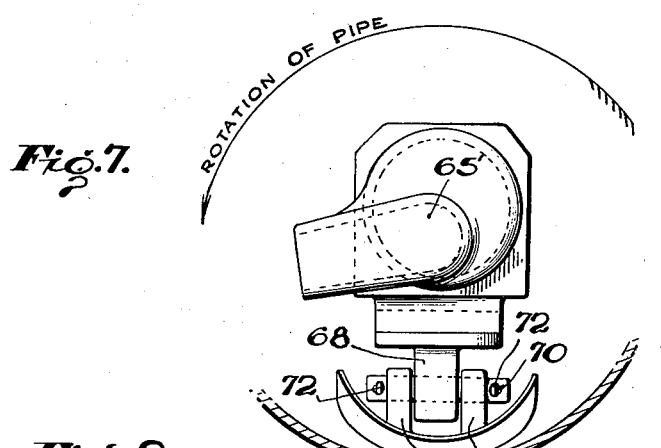
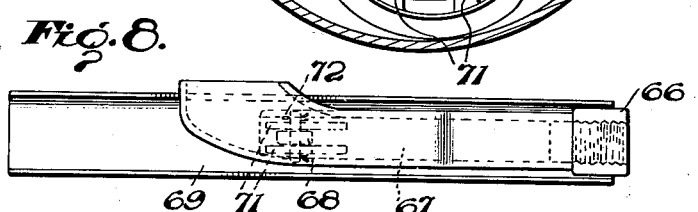
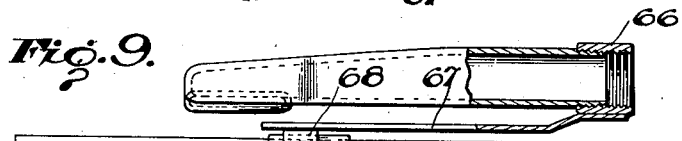
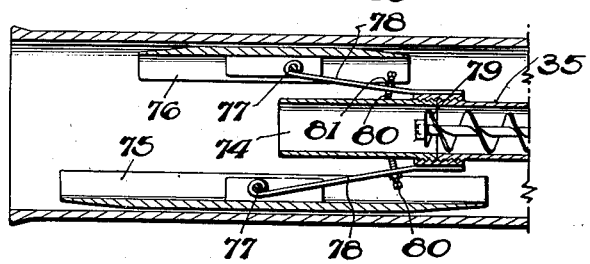
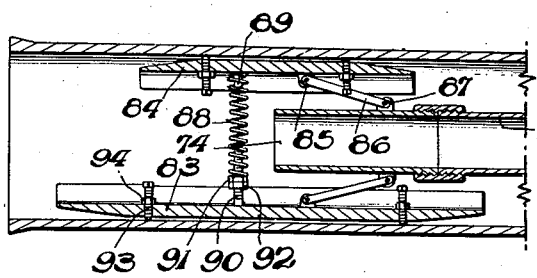
Inventor
Fred Stevens.
By Cameron, Kerkam + Sutton
Attorneys Patented Nov. 16, 1943

2,334,294

UNITED STATES PATENT OFFICE 2,334,294

APPARATUS FOR LINING PIPE

Fred Stevens, Birmingham, Ala., assignor to American Cast Iron Pipe Company, Birmingham, Ala., a corporation of Georgia Application December 14, 1939, Serial No. 309,276

12 Claims. (Cl. 25—38)

This invention relates to a method and apparatus for lining pipes or the like, and more particularly to a method and apparatus of the type characterized wherein the lining material is applied to the pipe or other hollow form while the latter is rotating so that the lining is formed under the action of centrifugal force.

Various procedures and apparatus have heretofore been proposed for forming cementitious linings on pipes or the like while the latter are rotating to subject the lining material to the action of centrifugal force, as for example by feeding or flowing the lining material lengthwise of the pipe while distributing the same by means of blades, strikes, or other similar gauging or spreading elements, or by depositing the lining material spirally on the inner face of the pipe from an axially traveling outlet while subjecting the deposited material to the action of rollers, brushes, or other similar wiping or smoothing contrivances, or by discharging a trough which extends the full length of the pipe and then spreading and smoothing the deposited material, etc., but all such procedures with which I am familiar are subject to various objections.

It is an object of this invention to provide an improved method and apparatus for lining pipes or the like which assures that the lining material closely adheres to the inner surface of the pipe, so that a strong, durable and permanent lining is thereby formed.

Another object of this invention is to provide an improved method and apparatus of the type characterized which assures that the lining material is properly troweled as well as spread uniformly over the inner face of the pipe.

Another object of this invention is to provide an improved method and apparatus of the type characterized which provides a lining of substantially uniform thickness and characteristics throughout the interior of the pipe.

Another object of this invention is to provide an improved method and apparatus of the type characterized which can be employed to form relatively thin as well as thick linings of substantially uniform thickness and characteristics.

Another object of this invention is to provide an improved method and apparatus of the type characterized which by laying a relatively thin lining of proper characteristics lining material is conserved and the time of setting is shortened.

Another object of this invention is to provide an improved method and apparatus of the type characterized which enables the thickness of the lining to be closely gauged.

Another object of this invention is to provide an improved method and apparatus of the type characterized which assures the formation of the lining under conditions whereby the inner surface thereof is rendered smooth and regular so as to minimize frictional losses from the flow of fluids therethrough.

Another object of the invention is to provide an improved method and apparatus of the type characterized which does not involve the flow of material across the inner surface of lining material already deposited either by way of introduction of the lining material or by way of withdrawal of undesired materials.

Another object of this invention is to provide an improved method and apparatus of the type characterized which provides for the expeditious forming of the lining so that the time the pipe is in the machine is cut down to a minimum.

Another object of this invention is to provide improved apparatus of the type characterized which is highly efficient in operation, which can be readily applied to the lining of pipes of different diameters, which is flexible in use so that desired speeds and ratios of pipe rotation, material deposition, material feed, etc., may be maintained, which is easy to control and adjust, and which is strong and durable.

Another object of this invention is to provide an improved method of the type characterized which is productive of a lining of improved characteristics.

Other objects of this invention will appear as the description thereof proceeds.

The invention is capable of receiving a variety of mechanical expressions, some of which are shown on the accompanying drawings, but it is to be expressly understood that the drawings are for purposes of illustration only, and are not to be construed as a definition of the limits of the invention, reference being had to the appended claims for this purpose.

Referring in detail to the drawings wherein the same reference characters are employed to designate corresponding parts in the several figures.

Fig. 1 is a longitudinal elevation, somewhat diagrammatic in character, to illustrate a preferred embodiment of the present invention;

Fig. 1a is a section taken at right angles to Fig. 1 to illustrate more particularly the means for raising the pipes from the rollers which rotate the same while the lining is being formed;

Fig. 2 is a fragmentary enlarged longitudinal section through the mechanism for feeding the lining material to the interior of the pipe;

Fig. 3 is a further enlarged fragmentary longitudinal section showing in plan one preferred nozzle and shoe construction;

Fig. 4 is a cross sectional view of another embodiment;

Figs. 5 and 6 are exploded views of the embodiment of Fig. 4, but to different scales;

Fig. 7 is a transverse section of another embodiment;

Figs. 8 and 9 are plan and sectional views of the nozzle and shoe of the embodiment of Fig. 7, but to a different scale; and Figs. 10 and 11 are longitudinal sections of two other embodiments of the present invention.

Referring first to Fig. 1, the machine of the present invention includes suitable mechanism for rotating a pipe while disposed in a substantially horizontal position, and mechanism for feeding the lining material longitudinally of the rotating pipe, the latter including means for feeding the lining material to the interior of the pipe and means for traversing the feeding means longitudinally of the pipe. In order that the machine may handle pipes of different diameters, lining materials of different characteristics, etc., the means for rotating the pipe, the means for feeding the lining material and the means for traversing the feeding means are preferably actuated by separate motors subject to independent control, so that a wide variety of relationships may be maintained between the rate of rotation of the pipe, the rate of feed of the lining material and the rate of traverse of the feeding means. However, while it is preferred to employ separate driving means for the three foregoing instrumentalities, such is not essential provided that the several driving means are suitably equipped with means whereby each may be separately controlled to provide the desired range of speeds for the respective instrumentalities.

As shown, the pipe to be lined, designated 1, is mounted in a substantially horizontal position in contact with the upper arcs of pairs of adjacent rollers 2 and 3 (see Fig. 1a) disposed lengthwise of the pipe. Any suitable number of pairs of rollers may be used, depending upon the length of the pipe to be lined, its size, etc., the illustrated embodiment including two such pairs as shown in the elevation of Fig. 1. The pipe rests by gravity on the upper arcs of said rollers with its axis substantially in the vertical plane midway between the axes of said rollers.

Rollers 2 and 3 may be mounted and driven in any suitable way. As shown, the rollers 2 are secured to a roller shaft 4, and the rollers 3 are similarly secured to a second roller shaft 5, both of said roller shafts 4 and 5 being mounted in suitable antifriction bearings 6 supported on standards 7 projecting from the base of or support for the machine. Roller shafts 4 and 5 are positively driven in any suitable way, as by chains 8 cooperating with sprockets 9 and 10 respectively mounted on the roller shafts and the shaft of an electric or other suitable motor 11, here shown as disposed in a pit 12 below the machine. Means are provided so that a wide range of speeds of rotation may be imparted to the rollers 2 and 3, as by varying the speed of the motor or by using a speed changer diagrammatically indicated at 13, but it is to be understood that any suitable speed controlling or speed changing mechanism may be employed between the source of power and the roller shafts so as to obtain the desired range of speeds. To retain the pipe in a predetermined position during the rotation of the same, the machine may include a stop 14 and the rollers 2 and 3 may be suitably designed in a well known manner so as to exert a longitudinal component of force on the pipe tending to hold the same in contact with the stop during the period of rotation.

The pipe to be lined may be moved into and out of operative position with respect to said rollers in any suitable way. In the embodiment illustrated the pipes are designed to be rolled along suitable rails or tracks disposed at right angles to the axis of the shafts 4 and 5, as shown at 15 in Fig. 1a, and the lined pipes may be removed from the machine by corresponding rails or tracks at the other side of the rollers, as shown at 16 in Fig. 1a. To raise and lower the pipe, a longitudinally extending member 17, disposed substantially in the midvertical plane between the shafts 4 and 5 is provided adjacent the opposite ends thereof (see Fig. 1a) with pairs of pivoted arms 18 and 19, and said member 17 is connected to a plunger or piston 20 which works in a cylinder 21 under hydraulic or pneumatic pressure. When the plunger 20 is elevated, the arms 18 and 19 are brought into horizontal position wherein they are in alignment with the upper faces of the rails 15 and 16 so that a pipe on the rails 15 may be rolled onto said arms 18 and 19, or a pipe raised by the arms 18 and 19 is in a position to be rolled onto the rails 16. When the plunger 20 is in its lowered position, as shown in Fig. 1a, the outer ends of the arms 18 and 19 are engaged with suitable stops 22 and 23 while the inner pivoted ends of said arms are withdrawn by member 17 to a position such that the arms are out of contact with the pipe 1, which is now supported entirely by the rollers 2 and 3.

Extending lengthwise of the machine are rails 25 on which is mounted a carriage 26 supported by pairs of wheels 27 cooperating with said rails. Mounted on the carriage 26 at any suitable location is a motor, diagrammatically indicated at 28, which is suitably connected as by chains 29 to said wheels 27 so as to rotate said wheels and thereby move the carriage 26 longitudinally of said rails. The motor 28 includes or has associated therewith any suitable speed controlling or speed changing mechanism, diagrammatically indicated by the rectangle 30, whereby the speed of traverse of the carriage 26 on the rails 25 may be suitably controlled and varied for a purpose that will hereinafter appear. However, any other suitable means for traversing the carriage may be employed if preferred.

Mounted on the carriage 26 is a frame 31 which may be raised and lowered with respect to the carriage, as by pivoting the frame to the carriage on an axis extending longitudinally of the carriage, so that the feed for the lining material now to be described may be raised or lowered into alignment with the axes of pipes of different sizes supported on the rollers 2 and 3. Mounted on said frame is a hopper 32 which may be supplied with lining material in any suitable way, as by means of a bucket 33' that may be conveniently suspended from a carriage running on a rail or rails which extend between the position shown and a position suitably located with respect to a cement mixer or other mechanism for forming the lining material.

Hopper 32 communicates with a feed tube 33 mounted in standards 34 on the frame 31. Coupled to said feed tube 33 are one or more sections of a feed tube 35 which may be of the same, but is preferably of a smaller diameter, said feed tube 35 being of sufficient length so that the same may be advanced from the position shown in Fig. 1 to one wherein the nozzle and shoe or shoes to be described have traversed completely through the longest pipe length to be lined in the machine. Suitably journaled in the feed tubes 33 and 35 (see Fig. 2) is a shaft or shafts carrying means for feeding the lining material from the hopper 32 through the feed pipes to the nozzle to be described. As shown, a shaft 36 is suitably mounted in the feed tube 33 and carries a screw conveyor 37, and said shaft is connected to a second shaft 38 which extends the length of the tube 35 and is also provided with a screw conveyor 39. In the preferred embodiment, as shown, the screw conveyor 39 is of smaller diameter and pitch than the conveyor 37, and similarly the tube 35 is of smaller diameter than the tube 33. Shaft 36 extends through the wall of the tube 33, as shown at 40, and is provided with suitable means for rotating the same, as a sprocket 41 indicated in Fig. 2. As shown in Fig. 1, sprocket 41 is driven by chain 42 from a sprocket 43 mounted on the shaft of an electric motor 44 supported on the frame 31. Motor 44 includes or has associated therewith suitable speed controlling or changing mechanism diagrammatically indicated at 45 so that the speed of rotation of the shafts 36 and 38 may be varied through the desired range in order to vary the speed at which the lining material is fed through the feed tubes 33 and 35. As understood, a single motor with separate speed controlling means could be mounted on the carriage, if preferred.

In order to support the relatively long length of the feed tube and screw conveyor, a bracket 46 is mounted on the frame of the machine and provided with antifriction rollers 47 to cooperate with the tube 35, while intermediate bracket 46 and carriage 26, a carriage 48 mounted on wheels 49 is designed to run on the rails 25 and carry one or more rollers 50 that support the tube 35 intermediate its length. The supports for the rollers 47 and 50 are made vertically adjustable as shown at 51 and 52 so that they may be properly positioned for cooperation with tube 35 as it is raised or lowered to be aligned with the axes of pipes of different diameters. As will be apparent, the tube 35 with its screw conveyor is supported at one end by the frame carried by the carriage 26, and is prevented from sagging by the rollers 47 and 50, the latter being mounted on the carriage 48 which is moved lengthwise of the machine by the frictional action of pipe 35 thereon.

Communicating with the feed tube 35 is a nozzle 54 with which is associated one or more shoes 55 as generally indicated in Fig. 1. As shown in the figures now to be described the nozzle and shoe unit may take a variety of forms but the unit or at least the shoe part thereof is preferably readily attachable and detachable so that different sizes may be quickly installed for pipes of different diameter.

In the embodiment shown in Figs. 2 to 6 and which now is the preferred construction for lining the larger sizes of pipes, the nozzle 54 is detachably attached to the end of the feed tube 35 in any suitable way, as by a coupling 56, and is provided with a lateral opening or spout at 57 (see more particularly Fig. 4) which delivers the lining material in a lateral direction. Mounted on the nozzle, in this embodiment, is an elongated shoe 58 which is arcuate in cross section as shown in Fig. 4 but of a smaller radius of curvature than the inner surface of the pipe to be lined, and rounded or beveled at its ends. Shoe 58 is provided in any suitable way with interior lugs 59 by which said shoe may be attached intermediate of its length to corresponding lugs 60 formed on or suitably attached to a curved member 61 from which extends a U-shaped strap member 62 of such size that it is adapted to embrace nozzle 54 as clearly shown in Fig. 4. The shoe 58 is thus floatingly mounted on said nozzle 54 so that under the action of gravity it may adjust itself to function as hereinafter explained. In order to properly guide the shoe 58 in its movements the legs of the U-shaped member 62 may be provided with slots 63, as shown in Fig. 5, to receive the ends of a pin 64 carried by a U-shaped bracket 65 mounted on and suitably secured to the nozzle 54. In this embodiment the weight of the shoe determines the pressure of the shoe on the lining material, and it may be given the desired weight, or be loaded, so as to obtain the desired pressure.

Another embodiment of the present invention, which now is the preferred construction for lining the smaller sizes of pipes, is illustrated in Figs. 7, 8 and 9. Here the nozzle 65' is readily attachable to and detachable from the pipe 35 by means of a threaded coupling nut 66. Secured to the nut 66 in any suitable way is a resilient arm 67 which carries adjacent its free end a lug 68 to which the shoe 69, which may be arcuate, channel shaped or otherwise rounded in transverse cross section, is pivotally attached in any suitable way, as by means of a pin 70 extending through said lug 68 and lugs 71 formed on or suitably attached to the rear of the shoe 69, said pin being retained against displacement in any suitable way as by cotter pins 72. Thus the shoe 69 is floatingly mounted, as in the embodiment of Figs. 2 to 6, but whereas in the embodiment of Figs. 2 to 6 gravity is the only force acting on the yieldingly mounted shoe, in the embodiment of Figs. 7 to 9 the inherent resiliency of the arm 67 assures that the shoe 69 shall be pressed against the lining material under a uniform elastic force which is determined by the resiliency of said arm.

In the embodiments of Figs. 2 to 9 inclusive the nozzle 54 or 65' is shown as delivering the lining material forward of that edge of the shoe toward which the inner periphery of the pipe is rotating, as is preferred, but it is within the purview of the broader aspects of this invention to deliver the lining material from the end of the pipe 35 or by an axially extending nozzle onto the back of the shoe, as shown at 74 in Figs. 10 and 11, the lining material flowing from the rear of the shoe to the inner surface of the pipe. Here, as in the other embodiments, the ends of the shoes are preferably beveled or rounded at the ends in an axial direction.

Figs. 10 and 11 also illustrate other features of the present invention which may be incorporated in the embodiments heretofore described as well as in those now to be described. In Fig. 10 a pair of shoes 75 and 76 are suitably supported from the end of the pipe 35, or the nozzle when used as preferred, the lower shoe preferably being materially larger than the upper shoe because it supports the weight of the end section of tube 35 with its conveyor and contained material. As shown in Fig. 10 each shoe is pivotally mounted at 77, as by means of a lug or lugs formed on or suitably attached to the rear of the shoe and a pin extending through said lug or lugs and the eye at the end of a resilient arm 78 suitably attached to the coupling sleeve 79. In this embodiment the tension of each resilient arm 78 may be adjusted and predetermined by means of a set screw 80 extending through the arm 78 into contact with the outer surface of the nozzle or pipe 35 and retained in adjusted position by a lock nut 81. A like adjusting means could, for example, be readily associated with the resilient arm 68 of the embodiment of Figs. 7 to 9.

In the embodiment of Fig. 11 the two shoes 83 and 84 are mounted by means of pivots 85 on links 86 which in turn are pivoted at 87 on suitable lugs formed on or attached to the nozzle or the end of the pipe 35. The pivot mountings may be loose, if desired, so as to give some universality to the movements of each shoe. To impose a predetermined resilient tension on said shoes one or more coil springs 88 react between the shoes and are centered by means of projecting posts 89 on shoe 84 and threaded posts 90 on shoe 83, posts 90 carrying nuts 91 whereby the tension of spring 88 may be adjusted and then locked by nuts 92. Other forms of springs and other manners of mounting the springs may be used if preferred. Such spring or springs, for example, could also be associated with a floatingly mounted shoe of the type shown in Figs. 2 to 6 inclusive.

Fig. 11 also illustrates an additional feature which may be incorporated in any of the foregoing embodiments, to wit, means for predetermining the thickness of the lining and preventing the shoe or shoes from contacting the inner face of the pipe. As here shown, each shoe is provided with one or more pairs of set screws 93 which project through threaded apertures in the shoes and preferably have hardened, rounded end surfaces for contact with the inner face of the pipe. Said set screws may be adjusted to predetermine the spacing of the outer face of each shoe from the inner face of the pipe and locked in adjusted position, as by lock nuts 94. Thus the spacing of the face of the shoe from the inner periphery of the pipe may be predetermined in advance, and while these set screws will initially form grooves in the lining material, such grooves are wiped out by the troweling action of the shoe or shoes and the centrifugal action to which the lining is subjected. Obviously such means for predetermining the spacing between the shoe or shoes and the inner face of the pipe may be employed whether one or more shoes are used and whether the shoe is mounted on a resilient arm as in Figs. 7 to 10, or for actuation only by gravity as in Figs. 2 to 6, as well as in other embodiments of the present invention.

While one shoe is at present preferred and it is at present preferred to mount such shoe on a resilient arm, as in the embodiments of Figs. 7 to 9, if the shoe is not mounted to float under gravitational action only as in Figs. 2 to 6, it is to be expressly understood that it is within the broader aspects of the present invention that any suitable number of shoes may be used and said shoes may be mounted in any suitable way, so long as the purposes and results of the present invention are accomplished, different sizes of pipes and different characters and consistencies of lining material presenting different conditions under which variations in the size, number of shoes and character of their mounting may be desired. Thus in place of a single shoe as shown at 76 or 84 in Figs. 10 and 11, a pair of aligned shoes, of shorter overall length than the longer shoe, may be preferred under some conditions, and said shoes may be floatingly mounted or resiliently actuated as in the embodiments heretofore described.

It is sometimes desirable to vibrate the pipe during some or all of the period when the lining is being laid, and for this purpose any suitable means as notched rollers, vibrators, etc., may be used. Thus in the embodiment of Fig. 2 there has been diagrammatically indicated at 95 a pneumatically operated vibrator, or it could be a mechanically operated hammer, which can be supported or actuated independently of the feed mechanism for the lining material, or it may be carried on an arm 96 suitably attached to the feed tube or the carriage therefor, so that said vibrator will be maintained radially opposite the shoe throughout the period of placement of the lining material.

In operation, a pipe to be lined, and whose interior has been carefully cleaned, though it may be moist, is suitably moved into position as by rolling the same along the rails 15, although a crane or the like could be used if preferred, until the pipe assumes the position shown at 1 in Fig. 1a. Having regard to the diameter of the pipe and character of lining material to be used, pipe 1 is rotated from motor 11 through rollers 2 and 3 at that speed which is suitable, in accordance with the present invention, for the placement of the lining material. The frame 31 having been suitably adjusted on carriage 26 so as to bring the axis of feed tube 35 substantially into alignment with the axis of the pipe to be lined, and a suitable charge of lining material having been deposited in the hopper 32, as by means of the dump bucket 33', motor 44 is operated to feed the lining material through the tubes 33 and 35 until it reaches the nozzle 54 (if the tube is not already full from a prior operation of the machine). Then the carriage 26 is advanced until the nozzle is just within the end of the pipe, the bell end of the pipe preferably being the end at which the coating operation is started. The speeds of the motors 28 and 44, or their associated change speed mechanism 30 and 45 respectively, are now properly adjusted so as to obtain the desired speed of traverse of the nozzle with its shoe or shoes axially of the pipe, and the desired speed of rotation of the feed screws 37 and 39 to deliver the lining material through the nozzle at the desired rate of flow, it being understood that depending upon the size of the pipe, the thickness of lining desired, the character of lining material employed, etc., the axial speed of the nozzle and the rate of delivery of the lining material are so varied as to assure a suitable rate of placement of the lining material taking into consideration also the rate of rotation of the pipe by the rollers 2 and 3. By maintaining the desired ratio between those speeds the thickness of the lining to be formed may be nicely predetermined.

Any suitable means may be employed for assuring that a uniform and continuous flow of the lining material to and by the feed screws is maintained. Thus the hopper 32 may be provided with its own feed screw, or it may be provided with a plunger that is actuated pneumatically, hydrostatically, mechanically or by gravity, or any other suitable means may be employed for advancing the lining material through the hopper, to avoid arching or voids and interruptions in its delivery of the lining material to the feed screws 37 and 39. The larger feed screw 37 not only advances the lining material axially of the machine but also acts to effect a more intimate intermixture of the ingredients of the lining material, and this material is then delivered to the smaller feed tube 35 and its associated feed screw 39, which further mixes the material, at a substantial pressure because of the reduction in cross section in the path of flow of the lining material. However, it is to be understood that feed tubes of two different diameters are not essential within the broader aspects of the present invention, as a feed tube of uniform diameter, whether of larger or smaller diameter, and a continuous feed screw of the same pitch and size throughout, may be employed if preferred. While one or more feed screws are preferred for feeding the lining material through the tubes 33 and 35, it is also to be understood that within the broader aspect of this invention other suitable means, as a hydraulically operated ram or the like, may be used for flowing the lining material to and through the nozzle or the like.

The character and consistency of the lining material may vary within relatively wide limits, depending upon the use to which the pipe is to be put, its size, desired thickness of lining, etc. The preferred lining material for ordinary use is a mixture of sand and cement, and again the proportions of these ingredients may be varied through a considerable range depending upon the character of lining desired and also upon the treatment it is to undergo. For many purposes a lining material of equal parts of fine, carefully screened sand and cement has been found suitable. The sand and cement of whatever ratio is suitably mixed in a mixer until a satisfactory intermixture has been effected, and it is then delivered in any suitable way, as by means of the dump bucket 33', to the hopper 32. The quantity of water used may also vary within relatively wide limits, but the mixture is preferably one that is relatively dry, so as to avoid the necessity of withdrawal of any excess water during the lining operation or the flooding of the pipe ahead of the lining material during placement. The mixture should be sufficiently moist so that a "float" finish may be produced as hereinafter explained, but the moisture should not be sufficient to cause the lining material to slump or the like during or after placement.

The speed of rotation of the pipe, the rate of feed of the lining material and the rate of traverse of the nozzle along the axis of the pipe being predetermined and related as heretofore explained, and the shoe if adjustably mounted having been set to effect that lining thickness which it is desired to obtain, the machine is now operated to cause the nozzle and shoe or shoes to traverse the entire length of the pipe, the lining material, owing to the rotation of the pipe, thus being laid in a helical path throughout the length of the pipe. Where as preferred the nozzle delivers the lining material to the inner pipe surface ahead of the leading edge of the shoe, the lining material is spread axially and circumferentially by the action of the shoe thereon, the shoe by reason of the character of its mounting being free to move as required to properly spread the material. Whether the shoe is mounted so as to be actuated only by gravity, or whether the shoe is also urged toward the pipe by resilient pressure, the lining material is also pressed and scrubbed onto the inner surface of the pipe, assuring that all irregularities in the pipe surface are filled in and that the lining material is rubbed into intimate contact with the inner surface of the pipe to effect a firm and permanent adhesive bond. At the same time, the lining material is being troweled by the shoe so as to improve its quality and still further effect a uniform distribution of the ingredients of the lining therethrough.

When the nozzle and shoe have traversed the entire length of the pipe, the machine is reversed without changing the setting of the shoe or shoes, and the nozzle and shoe or shoes may then be made to again traverse the pipe reversely, either with or without a delivery of lining material during the return movement. For certain sizes and uses of pipe it is preferable to apply lining material during the return movement also. When such is done, the rate of flow of the lining material during the return movement may be the same or it may be altered. In any event the troweling action of the shoe assures the distribution of the lining material so as to eliminate all voids and irregularities, and produces a smooth uniform lining of substantially equal thickness throughout the length of the pipe. Owing to the troweling action of the shoe during the return movement, whether lining material is deposited or not, the lining material is reworked, and if as preferred for certain sizes and characters of pipe additional lining material is also laid during the return movement, the second layer of lining material is worked into the first layer of lining material so as to produce a uniform and homogeneous lining of equal thickness throughout the length of the pipe. The return movement may be effected immediately after the laying of the first layer of lining material, or a lapse of time may intervene so as to allow the first layer to set somewhat. However, it is preferred not to have the second layer a distinguishable layer from the first layer, and therefore the return movement should be effected while the first layer is in such condition that the second layer will be troweled thereinto and produce a homogeneous lining during the return movement. If a thicker lining is desired additional traverses of the lining instrumentalities may be employed.

When the desired lining has thus been laid and troweled as heretofore explained, the nozzle and shoe are withdrawn from the interior of the pipe, and the speed of rotation of pipe is then materially increased so that additional centrifugal force is applied to the laid lining material to further improve its characteristics, adhesion, uniformity, etc., but more particularly to bring contained moisture to the inner surface thereof so as to produce a "float" finish. As soon as such finish appears the machine is stopped, the hydraulic ram 21 is operated to lift the arms 18 and 19 into alignment with the tracks 16, and the lined pipe is then rolled out of the machine—although as before indicated a crane or other suitable transporting means may be used if preferred.

The lined pipe is then allowed to stand for a suitable period so as to set the lining, this period being at least seven or eight hours, and preferably longer, after which the pipe may be provided with an interior coating of lining material which will protect the lining from the leaching action of water or other reaction, chemical or physical, of the fluid on the lining material. This coating not only protects the lining but may provide a hard smooth surface that reduces the friction of flow and prolongs the life of the lining. Any suitable lining material may be employed, as bituminous materials, paints, emulsions, lacquers, enamels, or other waterproofing or protective materials, the constitution of this lining layer forming no part of the present invention. The lined pipe is then seasoned, or it may be subjected to any other suitable curing operation.

While, as above indicated, it is preferred to trowel the lining during the return movement of the nozzle and shoe or shoes, even though no additional lining material is being deposited, it is within the purview of the broader aspects of this invention to provide for a more rapid movement of the carriage during one direction of movement, if desired, or if only one working of the lining is desired, provision may be made for feeding the nozzle and shoe rapidly through the pipe without depositing lining material, and then effecting the laying of the lining material in the manner heretofore described during the return movement of the carriage.

It will therefore be perceived that by the present invention a relatively thin layer of lining material is laid progressively, in a helical path, throughout the length of the pipe under conditions which assure that the lining material is scoured or rubbed onto the surface of the pipe at a substantially uniform pressure, whether this pressure is produced gravitationally or resiliently, and also well troweled during the formation of the lining. Thus a relatively thin lining of $\frac{1}{16}''$ to $\frac{1}{8}''$ may be laid, with the assurance that it is free of voids and interruptions and has substantially uniform thickness and bonding to the pipe throughout. Hence the present method is to be distinguished from procedures wherein the lining material, whether distributed lengthwise of the pipe by the spreading means or deposited in a helical path and then spread by the action of blades, rollers, brushes or the like, is not subjected to a uniform pressure that trowels and scrubs the lining material against the inner surface of the pipe. By means of the present invention the lining may be made relatively thin, not only conserving lining material and producing a smaller dimension of the internal cross section of the pipe, but also materially increasing the speed at which a pipe may be lined and the lining set because of the thinner layer of material involved.

The method of the present invention also provides for the lining being made of any desired thickness, by depositing a second layer of lining material, for example, while troweling the second layer into the first, so as to produce a layer of uniform thickness but homogeneous in cross section. Or after a layer of desired thickness has been deposited, it may be subjected to a second troweling action by another traverse of the shoe thereacross without deposition of additional lining material. When two or more layers of lining material are laid and troweled together, as well as when only a single layer is laid, the pipe may thereafter be rotated at the desired speed and for the desired length of time, to produce a desired redistribution of the ingredients of the lining material as disclosed in my copending application Serial No. 309,277, of which this is a companion application, if such is desired, the fact that homogeneous lining has first been obtained also assuring that the centrifugal action thereafter applied will secure a uniform effect in the redistribution of the lining material.

It will further be perceived that the machine of the present invention is possessed of many important advantages. It may be readily adjusted to act on pipes of a wide variety of diameters; and the speeds of pipe rotation, material feed and nozzle traverse may be readily adjusted so as to obtain a relatively wide range of ratios between these respective speeds to the end that they may be correlated with regard to the size and character of pipe being lined, the characteristics and consistency of the lining material, etc. At the same time, the machine may be readily employed for laying either one or more layers of the lining material and when a plurality of layers are laid the desired troweling action and thickness is obtained without any necessity for adjustment of the machine between successive traverses of the nozzle and shoe along the length of the pipe, inasmuch as the floatingly or resiliently mounted or actuated shoe will adjust itself to the increased thickness of the lining material, continuing to maintain a uniform pressure thereon, and at the same time troweling the top layer into the deposited layer so as to produce homogeneity in the lining material.

While the embodiments of the invention illustrated on the drawings have been described with considerable particularity, it is to be expressly understood that the invention is not limited thereto, as the same is capable of receiving a variety of mechanical expressions, some of which will now readily suggest themselves to those skilled in the art, while changes may be made in the details of construction, size and arrangements of parts, certain features illustrated only in conjunction with certain embodiments may be used with other embodiments, and various combinations of the disclosed features may be employed, while equivalents may be substituted for features of construction and procedure disclosed, all as will be apparent to those skilled in the art. Reference is therefore to be had to the appended claims for a definition of this invention.

What is claimed is:

1. In a machine for lining a pipe of the type employing pipe rotating means, means supported only exteriorly of the pipe and movable axially of the pipe for feeding moist lining material to the interior of the pipe and having a nozzle through which lining material is ejected into the pipe, and means for troweling and scrubbing the lining material onto the inner surface of said pipe mounted on said nozzle in approximate alignment therewith transversely of the pipe, said troweling means being floatingly mounted on said nozzle to exert a substantially uniform but yieldingly applied pressure on the lining material.

2. In a machine for lining a pipe of the type employing pipe rotating means, means supported only exteriorly of the pipe and movable axially of the pipe for feeding moist lining material to the interior of the pipe and having a nozzle through which lining material is ejected into the pipe, and means for troweling and scrubbing the lining material onto the inner surface of said pipe, said means including an axially elongated shoe in approximate alignment with said nozzle transversely of the pipe for acting on the lining material deposited by said nozzle, and means mounting said shoe to float on said nozzle so that said shoe may rise and fall by gravity.

3. In a machine for lining a pipe of the type employing pipe rotating means, means supported only exteriorly of the pipe and movable axially of the pipe for feeding moist lining material to the interior of the pipe, a nozzle through which lining material is ejected into the pipe, and means for troweling and scrubbing the lining material onto the inner surface of said pipe, said means including an axially elongated shoe in appropriate alignment with said nozzle transversely of the pipe for acting on the lining material deposited by said nozzle, and means floatingly mounting said shoe on said nozzle and resiliently urging said shoe into contact with said lining material.

4. In a machine for lining a pipe of the type employing pipe rotating means, means supported only exteriorly of the pipe and movable axially of the pipe for feeding moist lining material to the interior of the pipe, a nozzle through which lining material is ejected laterally into the pipe, and means for troweling and scrubbing the lining material onto the inner surface of said pipe, said means including an axially elongated shoe mounted on said nozzle in approximate alignment therewith transversely of the pipe, said shoe being floatingly mounted on said nozzle to exert a substantially uniform but yieldingly applied pressure on the lining material and having its axially extending leading edge positioned in substantially vertical alignment with the exit from said nozzle to receive the lining material deposited by said nozzle.

5. In a machine for lining a pipe of the type employing pipe rotating means, means supported only exteriorly of the pipe and movable axially of the pipe for feeding moist lining material to the interior of the pipe, a nozzle through which lining material is ejected into the pipe, and means for troweling and scrubbing the lining material onto the inner surface of said pipe, said means including an axially elongated shoe mounted on said nozzle in approximate alignment therewith transversely of the pipe for acting on the said lining material deposited by said nozzle, and means associated with said shoe for floatingly mounting the same on said nozzle, and including means for predetermining the distance of the surface of said shoe from the inner surface of the pipe.

6. In a machine for lining a pipe of the type employing pipe rotating means, means supported only exteriorly of the pipe and movable axially of the pipe for feeding moist lining material to the interior of the pipe, a nozzle through which lining material is ejected into the pipe, and means for troweling and scrubbing the lining material onto the inner surface of said pipe, said means including an axially elongated shoe mounted on said nozzle in approximate alignment therewith transversely of the pipe for acting on the said lining material deposited by said nozzle, means mounting said shoe to float on said nozzle and including a resilient means, and means for adjusting said resilient means to predetermine the pressure of said shoe on said lining material.

7. In a machine for lining a pipe of the type employing pipe rotating means, means supported only exteriorly of the pipe and movable axially of the pipe for feeding moist lining material to the interior of the pipe, a nozzle through which lining material is ejected into the pipe, and means for troweling and scrubbing the lining material onto the inner surface of said pipe, said means including an axially elongated shoe mounted on said nozzle in approximate alignment therewith transversely of the pipe and before whose leading edge said lining material is deposited by said nozzle, and means for mounting said shoe on said nozzle so that it may float and exert a substantially uniform but yieldingly applied pressure on the lining material.

8. In a machine for lining a pipe of the type employing pipe rotating means, means supported only exteriorly of the pipe and movable axially of the pipe for feeding moist lining material to the interior of the pipe, a nozzle through which lining material is ejected into the pipe, and means for troweling and scrubbing the lining material onto the inner surface of said pipe, said means including an axially elongated shoe mounted on said nozzle in approximate alignment therewith transversely of the pipe and before whose leading edge the lining material is deposited by said nozzle, and resilient means for mounting said shoe so that it may float and exert a substantially uniform but yieldingly applied pressure on the lining material.

9. In a machine for lining a pipe of the type employing pipe rotating means, means supported only exteriorly of the pipe and movable axially of the pipe for feeding moist lining material to the interior of the pipe, a nozzle through which lining material is ejected into the pipe, and means for troweling and scrubbing the lining material onto the inner surface of said pipe, said means including an axially elongated shoe mounted on said nozzle in approximate alignment therewith transversely of the pipe and before whose leading edge said lining material is deposited by said nozzle, and means slidingly mounting said shoe on said nozzle so that it may float under the action of gravity and exert a substantially uniform pressure on the lining material.

10. In a machine for lining a pipe, the combination of means for rotating the pipe at varying speeds, a carriage adapted to be driven at varying speeds axially of the rotating pipe and having its entire support exteriorly of the pipe, means supported only by said carriage for feeding moist lining material to the interior of the pipe at varying rates, and means for delivering the lining material along a helical path onto the inner periphery of said pipe including a nozzle, an axially elongated shoe in approximate alignment with the nozzle transversely of the pipe and adapted to exert a troweling and scrubbing action on the deposited lining material, and means mounting said shoe yieldingly on said nozzle to effect a substantially uniform pressure of said shoe on the lining material.

11. In a machine for lining a pipe, the combination of means for rotating the pipe at varying speeds, a carriage adapted to be driven at varying speeds axially of the rotating pipe and having its entire support exteriorly of the pipe, means supported only by said carriage for feeding moist lining material to the interior of the pipe at varying rates, and means for delivering the lining material along a helical path onto the inner periphery of said pipe including a nozzle, an axially elongated shoe in approximate alignment with the nozzle transversely of the pipe and adapted to exert a troweling and scrubbing action on the deposited lining material, and means mounting said shoe yieldingly on said nozzle to effect a substantially uniform pressure of said shoe on the lining material, said last named means including a resilient arm on which said shoe is pivotally mounted.

12. In a machine for lining a pipe, the combination of means for rotating the pipe at varying speeds, a carriage adapted to be driven at varying speeds axially of the rotating pipe and having its entire support exteriorly of the pipe, means supported only by said carriage for feeding moist lining material to the interior of the pipe at varying rates, and means for delivering the lining material along a helical path onto the inner periphery of said pipe including a nozzle, an axially elongated shoe in approximate alignment with the nozzle transversely of the pipe and adapted to exert a troweling and scrubbing action on the deposited lining material, and means mounting said shoe yieldingly on said nozzle to effect a substantially uniform pressure of said shoe on the lining material, said last named means including a pin and slot suspension of said shoe from said nozzle.

FRED STEVENS.